(12) United States Patent  (10) Patent No.: US 8,313,386 B2
Costa                     (45) Date of Patent:    Nov. 20, 2012

(54) CONSTANT-VELOCITY UNIVERSAL JOINT HOUSING

(75) Inventor: Stefano Costa, Poggio Rusco (IT)

(73) Assignee: Aktiebolaget SKF, Göteborg (SE)

( * ) Notice: Subject to any disclaimer, the term of this patent is extended or adjusted under 35 U.S.C. 154(b) by 192 days.

(21) Appl. No.: 12/732,082

(22) Filed: Mar. 25, 2010

(65) Prior Publication Data
US 2010/0248848 A1    Sep. 30, 2010

(30) Foreign Application Priority Data

Mar. 25, 2009 (EP) .................................. 09425117

(51) Int. Cl.
*F16D 3/224* (2011.01)
(52) U.S. Cl. .......................................... 464/145; 72/714
(58) Field of Classification Search .................. 464/123, 464/124, 140–146, 904–906; 72/714
See application file for complete search history.

(56) References Cited

U.S. PATENT DOCUMENTS

| 4,224,806 | A  | * | 9/1980  | Kobayashi ........... 464/905 |
| 4,698,047 | A  | * | 10/1987 | Welschof et al. ..... 464/145 |
| RE35,995  | E  | * | 12/1998 | Krude et al. ......... 464/145 |
| 5,885,162 | A  |   | 3/1999  | Sakamoto et al.              |
| 6,220,967 | B1 | * | 4/2001  | Miller ............... 464/145 |
| 7,841,948 | B2 | * | 11/2010 | Suzuki et al. ........ 464/144 |

FOREIGN PATENT DOCUMENTS

GB        1507972 A    4/1978

* cited by examiner

*Primary Examiner* — Gregory Binda
(74) *Attorney, Agent, or Firm* — Mark A. Ussai; Bryan Peckjian

(57) ABSTRACT

A housing for a constant-velocity universal joint includes a cup having a cylindrical outer surface, a shank integral with the cup, and a rotation axis extending through the cup and the shank, the cup and the shank being spaced apart along the axis. A shoulder is interposed between the cup and the shank and a recess extends into the cup outer surface and is disposed adjacent to the shoulder.

8 Claims, 2 Drawing Sheets

CONSTANT-VELOCITY UNIVERSAL JOINT HOUSING

This application claims priority to European Patent Application No. 09425117, filed Mar. 25, 2009, which is incorporated by reference herein in its entirety.

BACKGROUND OF THE INVENTION

The present invention relates to a constant-velocity universal joint housing.

Constant-velocity universal joints are articulated linkages for transmitting rotation between two (drive and driven) shafts, while maintaining a constant unit velocity ratio between the two shafts, regardless of the angle formed by the shaft axes, and comprise:

a core connected to one of the two shafts and having a number of radially-outward-open tracks;

a set of balls housed partly inside the tracks;

a ball retainer surrounding the core; and a housing connected to the other of the two shafts and housing the core, retainer, and balls.

The retainer in turn comprises:

a cup with tracks inside for housing the balls;

a male shank integral with the cup; and a shoulder between the housing and the shank.

In housings of the above type, the cup tapers towards the shoulder, and its larger-outer-diameter portion is bounded externally by a cylindrical outer surface used, for example, for centring for mechanical machining. The shoulder in turn is bounded externally by a cylindrical surface that substantially blends with the cylindrical outer surface of the cup, but forms a sharp change in the housing section with the cylindrical outer surface of the shank.

In actual use, e.g. in joints used in front-wheel-drive cars to connect the direction wheel hubs to the differential, the part most subject to failure and damage has proved to be the housing, precisely on account of the sharp variation in section between the shank and shoulder, which results in localized stress at the shoulder.

SUMMARY OF THE INVENTION

It is an object of the present invention to provide a constant-velocity universal joint housing designed to reduce such failure.

According to the present invention, there is provided a constant-velocity universal joint housing, comprising:

a cup having a cylindrical outer surface;

a shank integral with the cup;

a shoulder having a cylindrical outer surface interposed between the cup and the shank, wherein the cup, the shank and the shoulder are in series with each other along a rotation axis extending therethrough; and a recess formed in a side of the shoulder facing the cup and in an outer surface of the cup adjacent the shoulder, wherein the recess includes a first curved profile that extends from the cylindrical outer surface of the shoulder to a bottom of the recess and a second curved that flares in form of a truncated cone from the bottom of the recess to the cylindrical outer surface of the cup.

BRIEF DESCRIPTION OF THE SEVERAL VIEWS OF THE DRAWINGS

A non-limiting embodiment of the invention will be described by way of example with reference to the accompanying drawings, in which.

DETAILED DESCRIPTION OF THE INVENTION

Figure 1:
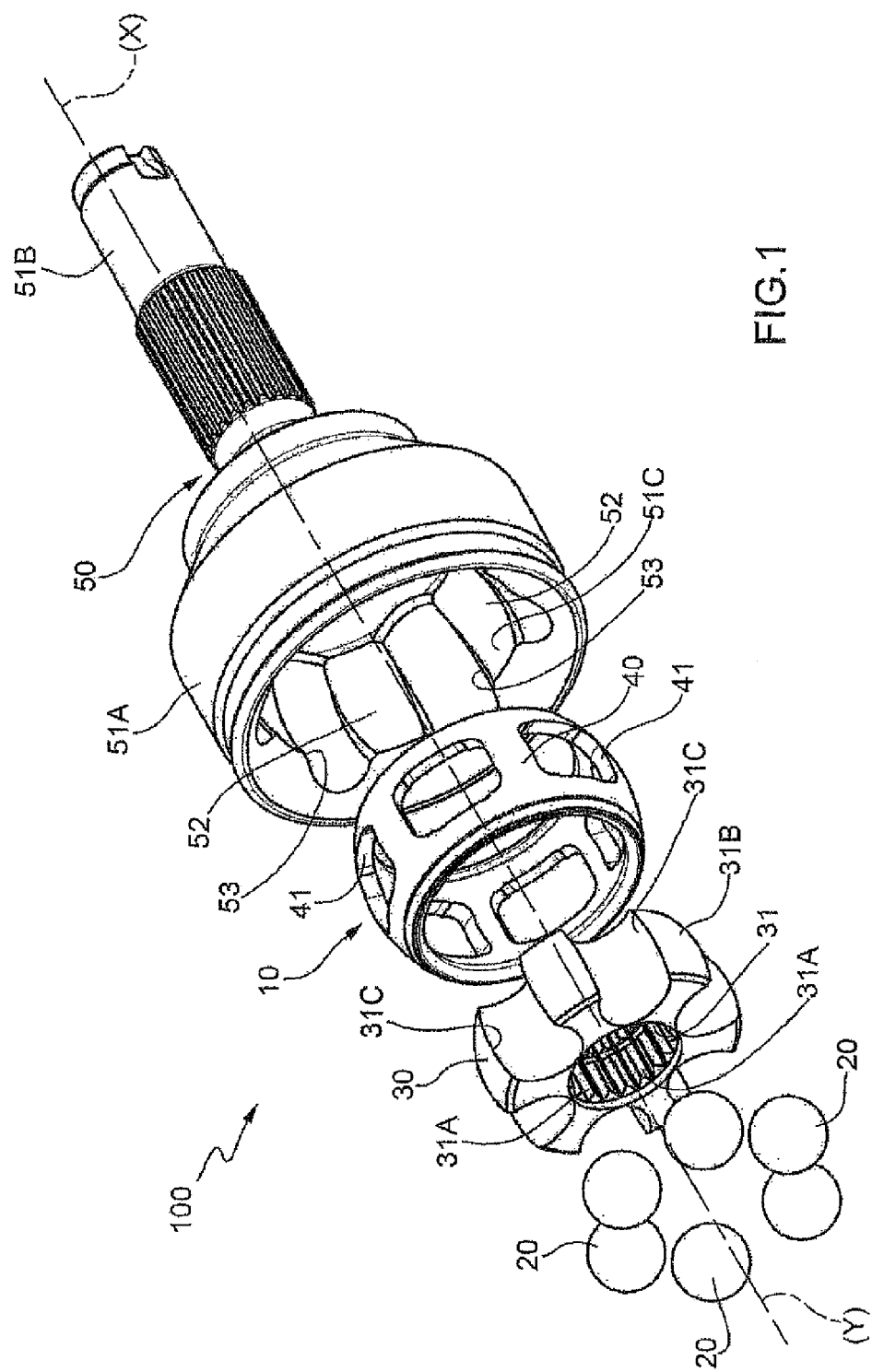
FIG. 1 shows a view in perspective of a preferred embodiment of a constant-velocity universal joint housing in accordance with the present invention.

Number 100 in FIG. 1 indicates as a whole a constant-velocity universal joint.

Figure 2:
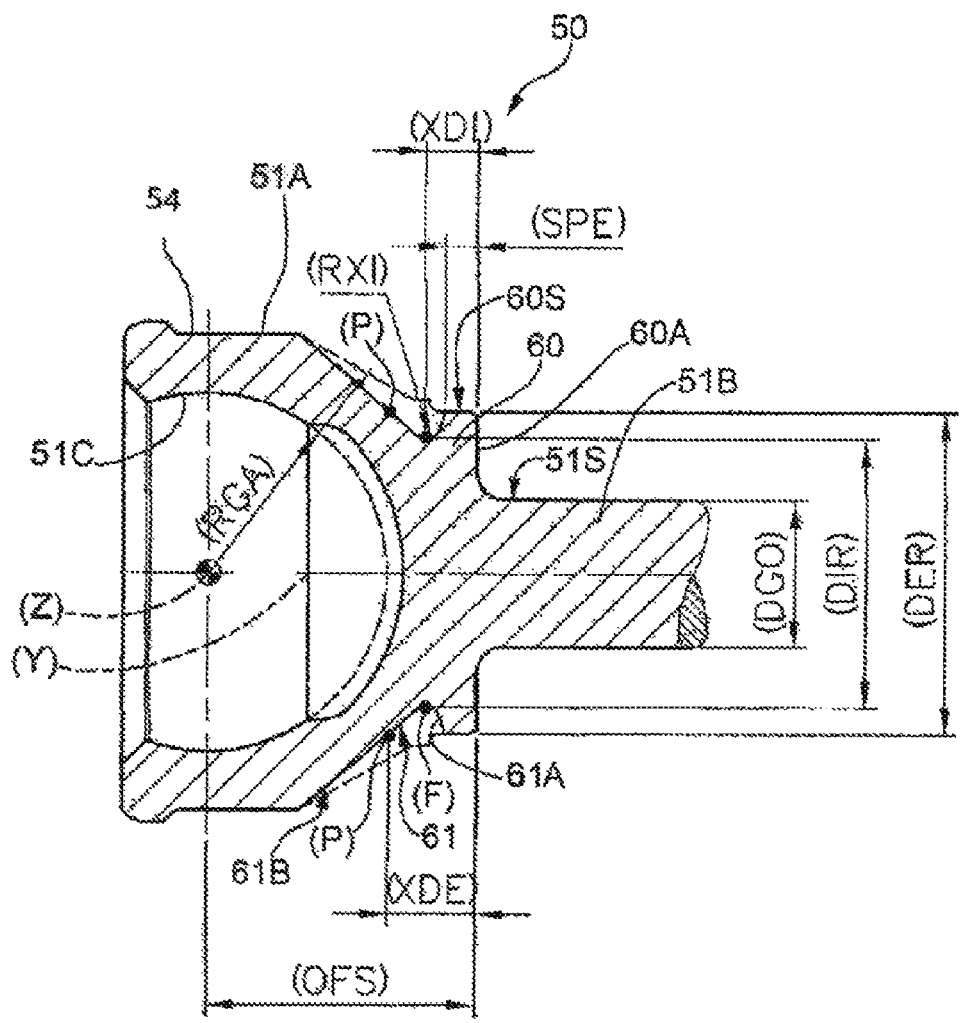
FIG. 2 shows a larger-scale axial section, with parts removed for clarity, of the FIG. 1 housing.

Joint 100 is an articulated linkage for transmitting rotation between a drive shaft and a driven shaft—shown schematically by an input axis (Y) and an output axis (X) respectively—which intersect and rotate with respect to each other about a centre of rotation (Z) (FIG. 2).

In the following description, specific reference is made, purely by way of example, to the above transmission of motion, since joint 100 may equally transmit motion from axis (X) to axis (Y).

Joint 100 comprises:

a core 30 connected angularly to the drive shaft and having a number of peripheral tracks 31C spaced about axis (Y);

a set of balls 20 housed partly inside tracks 31C; and a retainer 40 for retaining balls 20 and located radially outwards of core 30.

Core 30 has a central through hole 31 with a number of longitudinal grooves 31A, parallel to axis (Y), for housing and connection to the drive shaft, and is bounded radially outwards by an outer surface 31B, in which tracks 31C partly housing balls 20 are formed.

Retainer 40 has a number of openings 41 equal in number to tracks 31C, and which, together with tracks 31C, keep balls 20 aligned along a plane (not shown) bisecting the angle formed by axes (X) and (Y) and perpendicular to the plane containing axes (X) and (Y).

The joint 100 also comprises a housing 50 extending along axis (X) for connection angularly integral with the driven shaft, and which in turn comprises a cup 51A with a spherical inner surface 51C of radius RGA centred at centre (Z), and a male shank 51B aligned with cup 51A, on the opposite side to surface 51C along axis (X), and integral with cup 51A to define an interface with the driven shaft.

The cup 51A houses both the core 30 and the retainer 40 inside surface 51C, and comprises, inside surface 51C, a number of spherical surfaces 52 of radius RGA, and a number of tracks 53 corresponding to tracks 31C and alternating with surfaces 52 to house balls 20.

As shown in FIG. 2, housing 50 also comprises a shoulder 60 interposed between cup 51A and shank 51B, and bounded by two surfaces 60A and 60S; surface 60A is a lateral surface crosswise to axis (X) and facing shank 51B; and surface 60S is a cylindrical surface connected to surface 60A, and has an outside diameter DER larger than the diameter DGO of a cylindrical outer surface 51S of shank 51B.

As shown by the dash lines in FIG. 2, in the known art, surface 60S of shoulder 60 would substantially blend with a cylindrical surface 54 externally bounding cup 51A on the opposite side to shank 51B, but, as stated, the sharp change in the size of housing 50 between shank 51B and shoulder 60 would result in localized tangential stress as shoulder 60.

Therefore, to distribute stress at shoulder 60 and at the same time reduce the effects of the sharp change in the size of housing 50 between shank 51B and shoulder 60, and also between shoulder 60 and surface 54, housing 50 is provided with a recess 61 formed at shoulder 60, on the side facing cup 51A. In other words, the recess 61 extends into the cup outer surface and is disposed adjacent to the shoulder 60.

A recess 61 forms the outer contour of cup 51A between surface 60S of shoulder 60 and surface 54 of cup 51A to increase the mechanical resistance of housing 50 to static and dynamic stress, and hence the structural resistance of joint 100.

More specifically, recess 61 is formed through surface 60S, and is bounded by two curved profiles 61A, 61B in a plane containing axis (X); profile 61A reduces shoulder 60 to a flange of given axial thickness SPE; and profile 61B blends on one side with profile 61A at the bottom F of recess 61, and flares substantially in the form of a truncated cone to join up with surface 54 on the opposite side.

Projection of outer surface 60S of shoulder 60 along axis (X) onto profile 61B of recess 61 defines a circle P centred about axis (X), and the axial distance XDE of which from surface 60A is greater than the thickness SPE of shoulder 60.

To form an effective recess 61, in terms of improving the structural resistance of housing 50, it has been found necessary to take into account the relative sizing of various geometric parameters independent of housing 50, and various geometric parameters dependent on housing 50; the independent parameters being:

diameter DGO of surface 51S;
diameter DER of surface 60S;
the axial thickness SPE of shoulder 60, i.e. of the flange to which the shoulder is reduced by recess 61;
a so-called offset OFS, i.e. the axial distance, along axis (X), between centre (Z) and surface 60S of shoulder 60;
radius RGA of surface 51C; and
the inside radius RXI of the bottom F of recess 61;

and the dependent parameters being:
the inside diameter DIR of the bottom F of recess 61;
the axial distance XDI between the bottom F of recess 61 and surface 60A; and
the axial distance XDE of circle P obtained as stated above.

To increase the resistance of housing 50, given dimensional ratios are required between the above independent and dependent parameters, i.e.:

as regards the diameters involved:

$$0.4 \leq (DIR)/((DER)+(DGO)) \leq 0.7 \quad (1)$$

as regards the axial position of the major points characterizing the profile of recess 61:

$$1.6 \leq (XDE)/(XDI) \leq 2.5 \quad (2)$$

as regards the sizing of housing 50 to permit formation of inner concave surface 51C of cup 51A:

$$17 \leq (OFS) - 0.707(RGA) \leq 25 \quad (3)$$

All the above dimensional ratios apply for constant-velocity universal joints guaranteeing a ratio of 0.30 to 0.65 between diameters (DGO) of shank 51B and (2*(RGA)).

Also respecting the abovementioned ratios on the weighted difference between two independent parameters, the above dimensional relationships also provide for achieving balanced structural resistance within joint 100, with a view to reducing size and weight, as well as for minimizing said peak stress, thus prolonging the working life of constant-velocity universal joint 100 in "fatigue" and constant-stress conditions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A housing for a constant-velocity universal joint, the housing comprising:
   a cup having a cylindrical outer surface;
   a shank integral with the cup;
   a shoulder having a cylindrical outer surface interposed between the cup and the shank, wherein the cup, the shank and the shoulder are in series with each other along a rotation axis extending therethrough; and
   a recess formed in a side of the shoulder facing the cup and in an outer surface of the cup adjacent the shoulder, wherein the recess includes a first curved profile that extends from the cylindrical outer surface of the shoulder to a bottom of the recess and a second curved profile that flares in form of a truncated cone from the bottom of the recess to the cylindrical outer surface of the cup.

2. The housing of claim 1, wherein
   the shoulder has an outer diameter based on the cylindrical outer surface and an inner diameter based on the bottom of the recess;
   the shank has an outer diameter; and
   the ratio of the shoulder inner diameter to the sum of the shank outer diameter and the shoulder outer diameter is within a range of about 0.4 and about 0.7.

3. The housing of claim 1, wherein
   the shoulder includes a lateral surface facing the shank;
   the lateral surface is a first distance from the bottom of the recess and a second distance from an axial projection of the cylindrical outer surface of the shoulder to the second curved profile of the recess; and
   a ratio between the second distance and the first distance is within a range of about 1.6 and about 2.5.

4. The housing of claim 3, wherein
   the cup includes an inner spherical surface having an inner radius centered axially at a point;
   the lateral surface is a third distance from the point; and
   a difference between the third distance and 0.707 times the inner radius is within a range of about 17 and about 25.

5. The housing of claim 4, wherein a ratio between an outer diameter of the shank and twice the inner radius is within a range of about 0.30 and about 0.65.

6. The housing of claim 1, wherein
   the shoulder includes a lateral surface facing the shank;
   the cup includes an inner spherical surface having an inner radius centered axially at a point;
   the lateral surface is a distance from the point; and
   a difference between the distance and 0.707 times the inner radius is within a range of about 17 and about 25.

7. The housing of claim 1, wherein
   the cup includes an inner spherical surface having an inner radius; and
   a ratio between an outer diameter of the shank and twice the inner radius is within a range of about 0.30 and about 0.65.

8. The housing of claim 1, wherein a diameter of the cylindrical outer surface of the shoulder is less than a diameter of the cylindrical outer surface of the cup.

* * * * *